(12) United States Patent
Lee et al.

(10) Patent No.: US 6,480,287 B2
(45) Date of Patent: Nov. 12, 2002

(54) THREE DIMENSIONAL SCANNING SYSTEM

(75) Inventors: Chun-Hsing Lee, Hsinchu (TW);
Miin-Tsair Su, Fengshan (TW);
Wen-Shiou Lou, Hsinchu (TW);
Tung-Fa Liou, Hsinchu (TW)

(73) Assignee: Industrial Technology Research Institute, Hsinchu (TW)

(*) Notice: Subject to any disclaimer, the term of this patent is extended or adjusted under 35 U.S.C. 154(b) by 90 days.

(21) Appl. No.: 09/794,833

(22) Filed: Feb. 27, 2001

(65) Prior Publication Data
US 2002/0054297 A1 May 9, 2002

(30) Foreign Application Priority Data

Nov. 6, 2000 (TW) .......................................... 89123368

(51) Int. Cl.⁷ ......................... G01N 11/00; G01B 11/04
(52) U.S. Cl. ..................... 356/607; 356/607; 356/602
(58) Field of Search ................................ 356/607, 606, 356/608, 707, 376, 359; 382/254, 299

(56) References Cited

U.S. PATENT DOCUMENTS 5,831,719 A * 11/1998 Berg et al. .................. 356/5.13
5,838,765 A * 11/1998 Gershman et al. .......... 378/196
5,867,604 A * 2/1999 Ben-Ievy et al. ........... 382/254
6,313,461 B1 * 11/2001 McClelland et al. ........ 250/306

* cited by examiner

Primary Examiner—Georgia Epps
Assistant Examiner—Omar Hindi
(74) Attorney, Agent, or Firm—J.C. Patents

(57) ABSTRACT

A three-dimensional scanning system, that scans a three-dimensional object and calculates a three-dimensional coordinate data from a surface of the object. The three-dimensional scanning system has a photoelectron detector, a rotational scanning device, a drive device, an image processing circuit, and an operational control device. The photoelectron detector projects a light plane onto the object and then receives a reflected light stripe. The rotational scanning device couples with the photoelectron detector that rotates on a fixed pivot and allows the light stripe to scan on the object's surface. The drive device couples to and operates the photoelectron detector and the rotational scanning device. The image processing circuit can grab the light stripe instantly. The operational control device couples with the rotational scanning device and the photoelectron detector. The operational control device controls the motion of the rotational scanning device and the scanning position of the photoelectron detector, and then calculates the three-dimensional coordinates of the object.

21 Claims, 4 Drawing Sheets

THREE DIMENSIONAL SCANNING SYSTEM

CROSS-REFERENCE TO RELATED APPLICATION

This application claims the priority benefit of Taiwan application Ser. No. 89123368, filed Nov. 6, 2000.

BACKGROUND OF THE INVENTION

1. Field of Invention

The present invention relates to a scanning system. More particularly, the present invention relates to a scanning system that scans a three-dimensional object.

2. Description of Related Art

The photoelectron detector in a conventional three-dimensional coordinate scanning system uses a grab device, such as a camera. The grab device is built with an axis-symmetrical lens and an image sensor, such as a CCD. The ratio of the measuring depth and width of the photoelectron detector depend on an angle between the projecting optical trace of the photoelectron detector and the image-capture optical trace of the camera, where both traces intersect at a region of the object. According to the triangulation principle, the angle between the projecting optical trace and the image-capture optical trace is smaller and the shielding effect is lower. The detector size is also smaller, but the difference between the measuring depth and width is greater. For example, when scanning a human face, the measuring width is 200 mm and the measuring depth is 1200 mm. However, the measuring depth of a conventional three-dimensional scanning system is only up to approximately 300 mm, which is only a quarter of the measuring depth range for the human face. Therefore the resolution of the depth is worse.

Because the photoelectron detector measures an optical line one at a time, a scanner needs to be arranged to allow the photoelectron detector to move relative to the object, therefore every region of the object can be measured by the scanner. This method uses mechanical positioning abilities to measure the different regions of the object and register the data. All the data is registered using an identical coordinate system. A conventional scanner generally has a multi-movable axle and a revolving spindle (e.g., an XYZ three-movable axle and a revolving spindle). When the number of axes is greater, the amount of dead space measured can be decreased. However, this kind of scanning system has many disadvantages. For example, the scanning system is large and bulky and cannot be moved easily. The measurement range is limited by the limitations of the scanning system's range of movement. Also, the manufacturing cost is very high.

The above system uses multi-view data registration, which uses the mechanical positioning method to record and return the data of different measured positions to an identical coordinate system. These days, software technology for positioning is emerging and developing continuously, and accordingly, there are now many methods for positioning. For example, there are methods that use the geometric features of the object, the surface color of the object, or the reflectivity of the object. Therefore, using the mechanical positioning method to register data is no longer necessary.

In the software positioning method, a common region is obtained from the data measured at many different locations on the object. The relationships between the locations and the coordinate system are worked out, and the relationships refer back to the same coordinate system. Therefore, the scanner uses the plane-scanning method that is, one area region of the object is scanned in each scan. The conventional method measures a fixed angle from a light source hitting the scanning mirror, and the camera is fixed in a set position. Because the optic axis and the camera's optic axis are constantly changing, the camera lens cannot focus all the light planes of the different angles. If the lens focuses one light plane of one angle, the image quality of the other light planes of the other angles will be worse. If the angle deviates from the focus plane, the image quality will be worse (the light stripe will become hazy and rough). The quality of the measurement will be affected, and the precision of the measurement will be reduced.

Moreover, aside from grabbing the image from the light stripe, the camera also grabs an image from the background environment. In order to grab a light stripe, the commercially sold frame grabber needs to use a software method that performs complex image processing steps. This method requires a lot of time, which in turn affects the scanning speed.

SUMMARY OF THE INVENTION

The invention provides a three-dimensional scanning system.

As embodied and broadly described herein, the invention uses the anamorphic principle and provides a different rate of image magnification between the horizontal and vertical directions. The resolution can be adjusted between the measuring depth and the measuring width, and also can be applied in different measuring situations to increase the resolution.

The invention provides a three-dimensional scanning system and it uses the software registration method without the multi-axle scanner. The measuring range is not limited, and the photoelectron detector can be moved randomly.

The invention provides a three-dimensional scanning system. The scanning system can solve the problem of an unfocused image, where the angle is fixed between the project-track and the camera optical track. Therefore when the light plane scans in a different region, the light stripe can focus on the image plane and obtain the best measurement quality.

The invention provides a three-dimensional scanning system that can provide an image processing circuit and can completely grab a light stripe without grabbing the environmental light around the object.

The three-dimensional scanning system of the present invention can scan and calculate the three-dimensional coordinate data from an object's surface. The three-dimensional scanning system comprises a photoelectron detector, a rotational scanning device, a drive device, an image-capture circuit and an operational control device. The photoelectron detector creates a light plane to scan on the object, and receives the reflected light stripe from the object's surface. The rotational scanning device couples with the photoelectron detector that is placed in a fixed axis and is rotated, and the light stripe is allowed to scan the object. The drive device couples to and operates the photoelectron detector and the rotational scanning device. The image processing circuit can grab the light stripe instantly. The operational control device couples with the rotational scanning device and the photoelectron detector. It controls the motion of the rotational scanning device and the scanning position of the photoelectron detector and calculates the three-dimensional coordinates of the object.

In the foregoing, the photoelectron detector includes a projecting device and an image-capture device. More particularly, the projecting device projects the light plane along the optical trace and forms the light stripe on the object's surface. The image-capture device has a fixed angle between an image-capture optical trace and the projecting optical trace, and receives the reflected light stripe from the object surface.

In the foregoing structure, this invention of the three-dimensional scanning system has a simple machine structure. The simple rotational scanning device and the photoelectron detector without the multi-axles can have a small body size, the manufacturing cost is lower, and the device can be portable. The photoelectron detector includes an anamorphic optics device and a light source. The anamorphic optics device can adjust the magnifying power of the horizontal and vertical directions, and also can adjust the measuring depth and the measuring width, and increase the resolution. The light source can be a laser, for example. It scans according to a fixed angle between the projecting optical trace and the camera optical trace in a range and allows the light stripe that comes out to have the best image quality.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The invention relates to a photoelectron three-dimensional coordinate measurement system. The measurement principle is optical triangulation. More particularly, the method casts a light plane onto the surface of the object, and a light stripe is formed on the surface of the object. Then a camera records the reflected light stripe from the object's surface in an angle between the optical trace and the projecting optical trace. The three-dimensional coordinates of the object's surface are recorded and calculated from the light stripe, the light plane and the geometric parametric data of the camera.

Figure 1:
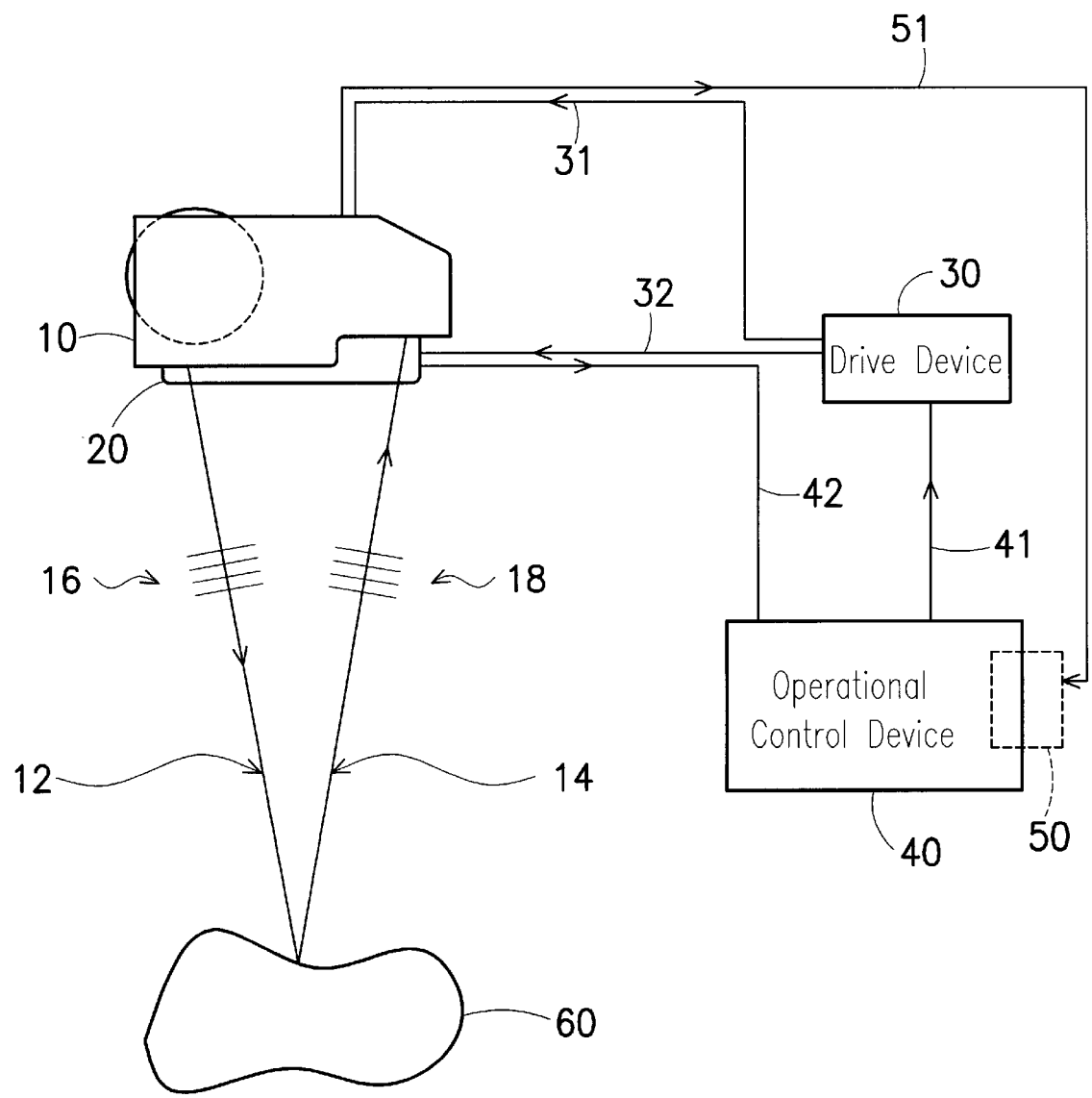
FIG. 1 illustrates the structural diagram of a three-dimensional scanning system.

FIG. 1 illustrates the structural diagram for the three-dimensional scanning system. The three-dimensional scanning system scans and calculates the three-dimensional coordinate data from the surface of object 60. The three-dimensional scanning system includes a photoelectron detector 10, a rotational scanning device 20, a drive device 30, an image-capture circuit 50 and an operational control device 40. The photoelectron detector creates a light plane 16 that is along a projecting optical trace 12, and projects the light plane 16 to the object 60. The light plane 16 is projected onto the object and a light stripe 18 is reflected back. The light stripe 18 is along the image-capture optical trace 14 and is received by the photoelectron detector 10. The rotational scanning device 20 couples with the photoelectron detector 10 that is rotated in a fixed axis. The light stripe 18 scans and moves on the object 60, and reflects back to the photoelectron detector 10. The drive device 30 couples to and drives the photoelectron detector 10 and the rotational scanning device 20 which are respectively connected to the drive device 30 by the connecting wires 31 and 32. The image-capture circuit 50 couples to the photoelectron detector 10 by the connecting wire 51 and grabs the image instantly by receiving the light stripe 18. The operational control device 40 can couple to the drive device 30 and rotational scanning device 20 respectively by the connecting wires 41 and 42. The operational control device 40 also connects to the image capture circuit 50 and records the data. Then the operational control device 40 can control the motion of the rotational scanning device 20 and the scanning position of the photoelectron detector 10, finally calculating the three-dimensional coordinates of the object 60.

In the foregoing, the operational control device 40 is just like a simple personal computer (PC) that processes software and hardware. The image-capture circuit 50 is like a PC interfacial card that can be used in the computer. Normally, the camera of the photoelectron detector 10 receives the image from the light stripe and also receives the background image around the object 60. The background image does not need to be recorded in the database. The commercially sold frame grabber can grab the light stripe, but it requires powerful software to perform this complicated image processing. The software also requires a lot of time to create an image and record in the data, and the scanning speed is affected. Therefore, the image-capture circuit 50, which is also called the image processing logical circuit, has a circuit structure design to receive a complete light stripe.

Moreover in the foregoing, the rotational scanning device 20 comprises a power source, a transmission device and a locational sensor. The power source provides the power for the photoelectron detector 10 and the rotational scanning device 20. The transmission device couples with the power source, and is connected to the photoelectron detector 10 that rotates in a fixed axis. The locational sensor measures a rotational angle and sends a data to the operational control device 40.

Figures 2A, 2B:
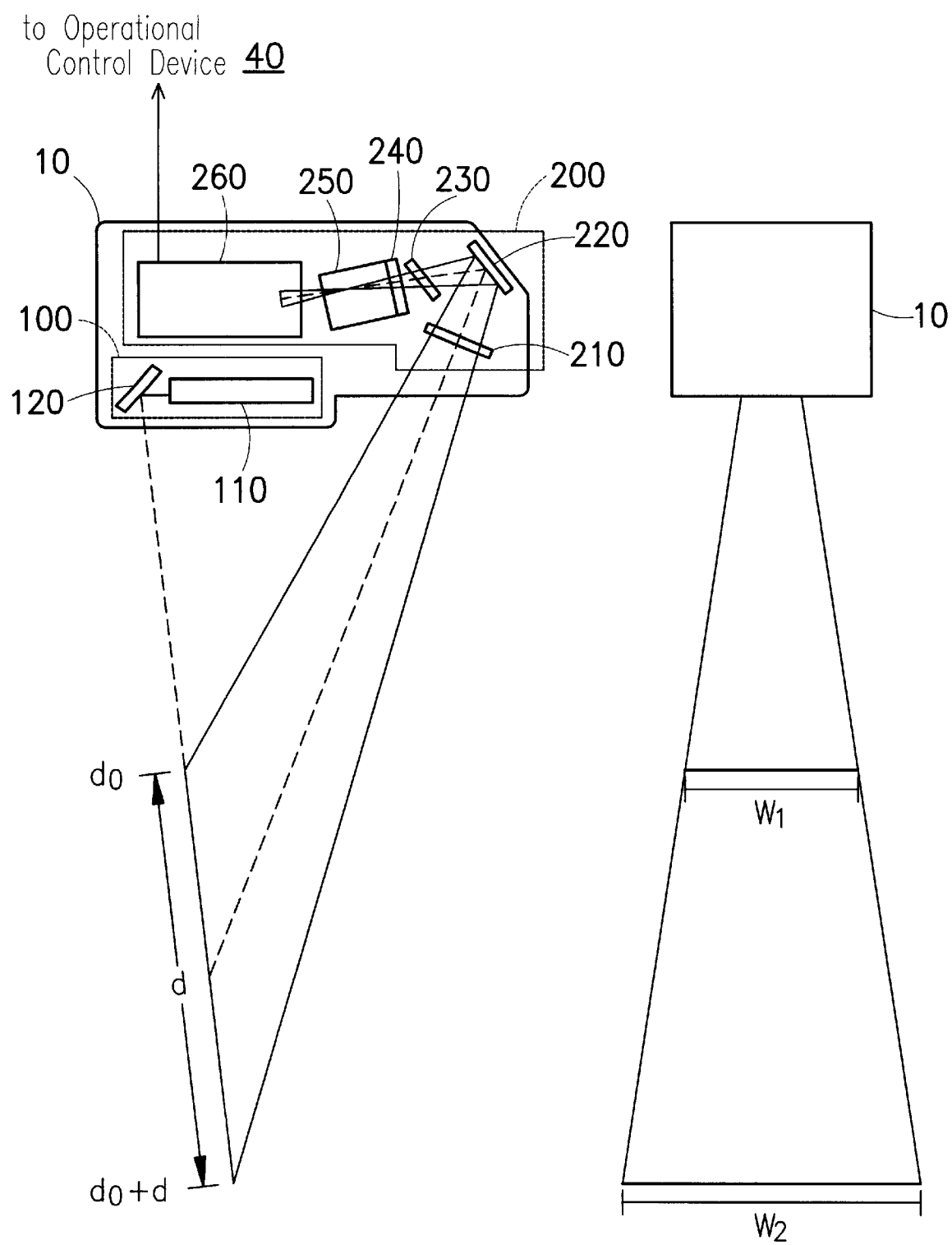
FIG. 2A through FIG. 2B illustrate the internal structure of the photoelectron detector that can adjust a range of the measuring depth and the measuring width, according to one preferred embodiment of this invention.

Referring to FIG. 2A and FIG. 2B, the internal structure of the photoelectron detector is shown. The photoelectron detector can adjust the measuring depth and the measuring width.

Referring to FIG. 2A, the internal structure of the photoelectron detector 10 of FIG. 1 is shown. The photoelectron detector 10 provides a projecting light device 100 and an image capture device 200. The projecting light device 100 projects the light plane along the projecting optical trace 12 to the surface of the object 60 and forms the light stripe 18. The image capture device 200 has an fixed angle between an image-capture optical trace 14 and the projecting optical trace 12, and receives the reflected light stripe 18 from the object 60.

Referring to FIG. 2A, the projecting light device 100 includes a light source 110 and a reflecting mirror 120. The reflecting mirror 120 is placed in front of the light source 110 and reflects the light along the projecting optical trace 12. The light source 110 forms the light plane 16 along the projecting optical trace 12 and projects to the object 60. The angle between the reflecting mirror 120 and the light source 110 can be determined by the actual design in practice. Usually, the light source is a laser light source or another source. The projecting light device 100 can install a narrow bandpass filter, which is not shown in the diagram. It allows a light plane of a fixed wavelength to pass through and filters other wavelengths of the background light. The image capture device 200 provides an image sensor device 260 and an anamorphic device. The image sensor device 260 receives the reflected light stripe 18 from the object 60 and transforms the light signal to an electric signal from the light stripe 18. The anamorphic device couples to the image sensor device 260 and creates an image from the light stripe 18 on the image sensor device 260. The horizontal and the vertical directions of the image are different in magnifying power, and both the depth and width on the object 60 can be adjusted.

The anamorphic device comprises an axis-symmetrical lens 250, a narrow bandpass filter 240, a reflecting mirror 220 and cylindrical lens sets 210 and 230. The image-capture optical trace 14 and the projecting optical trace 12 form a fixed angle for triangulation to measure. The cylindrical lens 210 and 230 have different focal lengths and different magnifying power between the horizontal and vertical directions to adjust the depth and width measurements of the object. The reflecting mirror 220 captures the turning optical trace where the light stripe comes from the cylindrical lens set 210 and is reflected to the cylindrical lens set 230. The cylindrical lens sets 210 and 230 are two cylindrical lenses. For example, the cylindrical lens set 210 is a plane-concave lens and the cylindrical lens set 230 is a plane-convex lens, and both lenses are placed in parallel where they can control one direction, either the horizontal or vertical direction, and enlarge or diminish the image. Because the angle between the cylindrical axis and the image-capture optical trace is an acute angle, the resolution of the image is clearer. The best image resolution with the best design can be obtained. The narrow bandpass filter 240 allows light with a special wavelength of light source 110 to pass through and prevents other background light from interfering. The symmetric axis lens 250 receives the light stripe 18 that is reflected from the object 60 and then forms the image on the image sensor device 260. The angle between the sensor plane and the anamorphic device of the optical trace, which is shown by the dotted line on the diagram, is a fixed angle, and it forms a clear image on the image sensor device. In the final step, the image sensor device 260 converts the light signal to an electric signal, and then transports the electric signal to the image processing circuit 50 which then transports the signal to the operational control device 40.

In the foregoing, the cylindrical lens sets 210 and 230 have different focussing points and different enlargement rates between the horizontal and vertical directions. The depth from the object can be adjusted between a range from $d_0$ to $d_0+d$, and the width can be adjusted between a range from $W_1$ to $W_2$. Like the foregoing example, after using the anamorphic lens, the depth measurement can be as low as 400 mm remaining the same angle between the projecting optical trace and the camera optical trace, and the width measurement still stays at 200 mm.

Figures 3A, 3B:
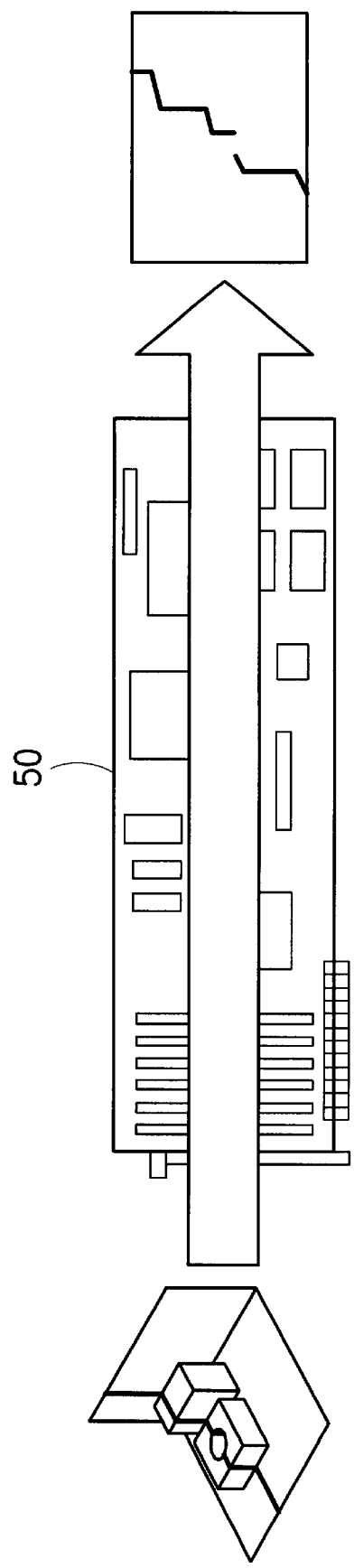
FIG. 3A through FIG. 3B illustrate the image processing circuit that creates an image, according to one preferred embodiment of this invention.

Referring to FIG. 3A through FIG. 3B, the image processing circuit that forms an image is shown. FIG. 3A is the input image from the photoelectron detector 10 and output from the image-capture device. FIG. 3B is the light stripe processed from the image processing circuit 50. The image processing logical circuit 50 finds every brightness point and gray gradient region of the object and stores the data in the memory and outputs to the operational control processor 40. When each brightness region of the light stripe is scanned, the image processing circuit 50 will receive the whole image.

Figure 4:
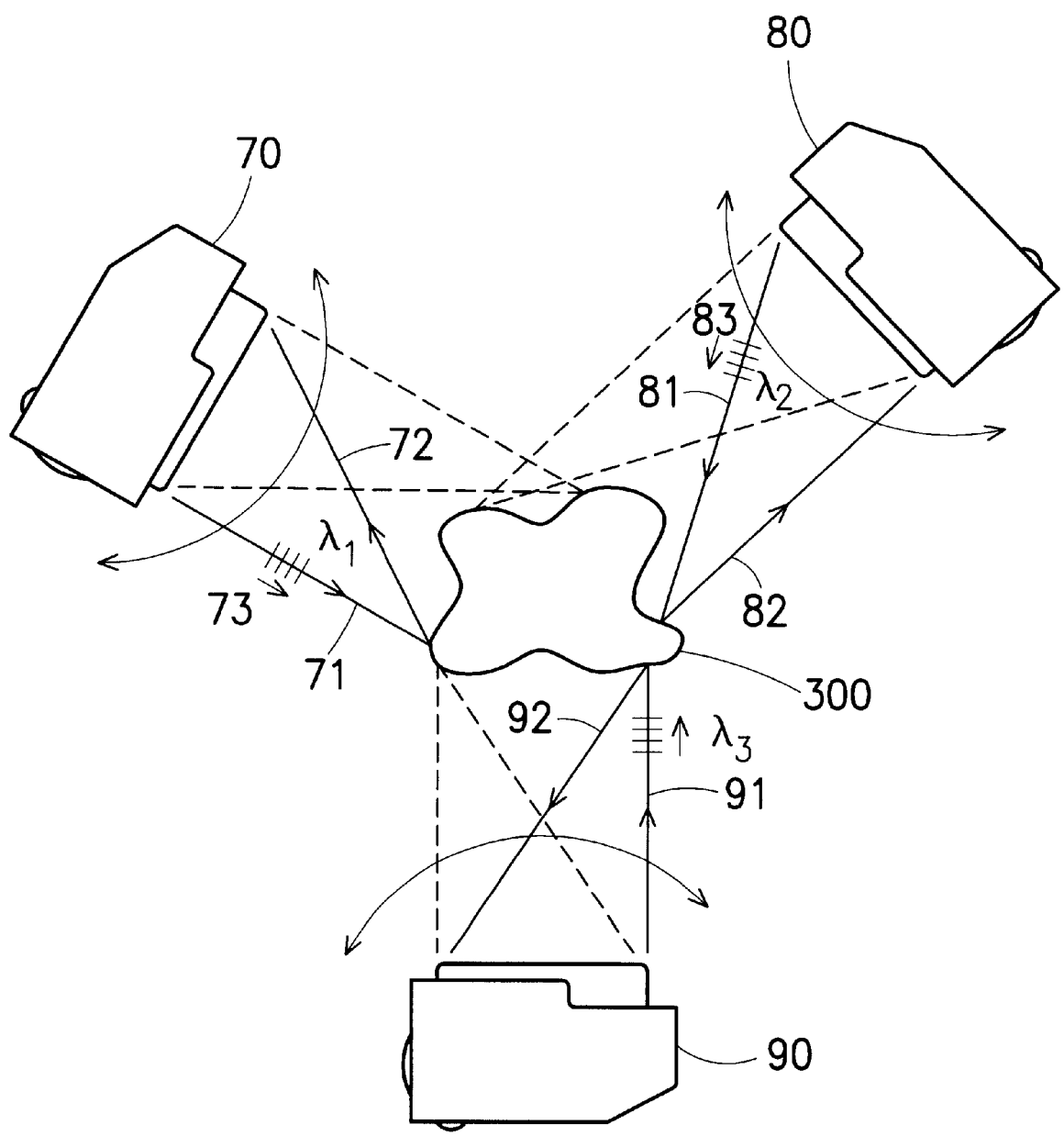
FIG. 4 illustrates the scanning setup structure for the photoelectron detector with more than two detectors, according to one preferred embodiment of this invention.

Furthermore, this invention can add more detectors to detect the object if necessary. Referring to FIG. 4, the scanner framework for the photoelectron detector is shown, and there are three sets in the diagram. In the figure, the framework can more easily scan a changeable shape or a moveable object, such as the human body. In this figure, three photoelectron detectors 70, 80 and 90 are performing the same function similar to a single photoelectron detector; therefore, it is unnecessary to repeat the description.

FIG. 4 shows three photoelectron detectors 70, 80 and 90, which are placed around the object 300 respectively in an appropriate position. Each detector can rotate the rotational scanning device in a fixed axis, as shown by the arc arrow in the diagram. The photoelectron detector 70 projects the light plane 73 along the projecting optical trace 71 on the surface of the object 300, then receives the reflected light stripe along the image-capture optical trace 72. The scanning range of the photoelectron detector 70 is shown from the solid line to the dotted line area in the figure. Similarly, the photoelectron detector 80 projects the light plane 83 along the projecting optical trace 81 on the object 300, then receives the reflected light stripe along the image-capture optical trace 82. The photoelectron detector 90 projects the light plane 93 along the optical trace 91 on the object 300 and receives the reflected light stripe along the optical trace 92.

There are three different wavelengths on the light planes 73, 83 and 93 which can avoid interference from each other during the operation. The three detectors have different narrow bandpass filters, and each detector can only receive its own wavelength, although different wavelengths pass through the other detectors. Each detector receives and creates its own image, thus avoiding the interference problem.

The three-dimensional scanning system of this invention can obtain the three-dimensional data from the object's surface. The photoelectron detector be held by hand or placed on a tripod, and it is convenient to move and measure different parts of the object. The lens of the photoelectron detector is an anamorphic lens, which can adjust the depth and width of the measurement. The measurement range can be adjusted to get the whole image plane and the best resolution. Also, when the photoelectron detector scans the object, a fixed angle is maintained between the projecting optical trace and the image-capture optical trace. In the measurement region, the light stripe can clearly focus on the image surface. According to the characteristics of the object, more detectors can be added to scan the object. Because the image processing logical circuit can process the data quickly, it can get the complete three-dimensional data in a short time.

In summary of the foregoing, this invention of the three-dimensional scanning system has at least the following advantages.

This invention has very simple mechanical advantages in that it has a simple rotational scanning device and a photoelectron detector. Therefore, the system is smaller, has a lower cost and is easily portable and moveable.

According to this invention, the photoelectron detector comprises an anamorphic device, which can adjust the magnifying power between the horizontal and vertical direction. Thus, it can adjust the depth and width measurements and increase the resolution.

According to this invention, the system can add more detectors to scan the object. All the data will be collected from each detector and transported to the image processing logical circuit that has the fastest data processing ability. Then the capture of the three-dimensional data of the dynamic object can be completed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanning system for a three-dimensional object, the scanning system comprising:

a photoelectron detector that forms a light plane, scans an object, detects the object's surface and receives a reflected light stripe;

a rotational scanning device coupled to the photoelectron detector, wherein the photoelectron detector is placed and rotates in a fixed axis and the light stripe scans the surface of the object;

a drive device coupled to and controlling the photoelectron device and the rotational scanning device;

an image processing circuit that is coupled to the photoelectron detector and captures the light stripe immediately; and an operational control device coupled to the rotational scanning device, the drive device and the image-capture circuit, wherein the operation control device controls the motion of the rotational scanning device and a scanning position of the photoelectron detector, and calculates three dimensional coordinates of the object.

2. The scanning system as claimed in claim 1, wherein the photoelectron detector, comprises:

a projecting light device that projects the light plane along a projecting optical trace of the projecting device light to the object's surface and forms the light stripe; and an image-capture device having a fixed angle between an image-capture optical trace and a projecting optical trace, wherein the image-capture device receives and detects the reflected light stripe from the object's surface.

3. The scanning system as claimed in claim 2, wherein the projecting light device comprises a narrow bandpass filter that allows a fixed wavelength of the light plane to pass through and filters the other wavelengths of surrounding environmental light.

4. The scanning system as claimed in claim 2, wherein the image-capture device, comprises:

an image-sensor device that receives the light stripe and converts the light stripe to an electrical signal; and an anamorphic device that couples to the image-sensor device by optics, forms the light stripe on the image-sensor device, wherein the anamorphic device has a different horizontal magnification power and vertical magnification power, and the depth and the width of the object can be adjusted.

5. The system claimed in claim 2, wherein the image-capture device further comprises a narrow bandpass filter that allows the wavelength of the light stripe to pass through and filters other wavelengths of surrounding environmental light.

6. The scanning system claimed in claim 4, wherein a sensor plane of the image-sensor device and an optical trace of the anamorphic device has a fixed angle.

7. The scanning system claimed in claim 4, wherein the anamorphic device comprises:

a cylindrical lens set that is placed on the image-capture trace and receives the light stripe; and a axis-symmetrical lens that receives the light stripe from the cylindrical lens and creates an image on the image-sensor device, wherein the cylindrical lens set has a different horizontal magnification power and vertical magnification power.

8. The scanning system claimed in claim 7, wherein the cylindrical lens set comprises two cylindrical lenses at least that make the image magnifying power different between the horizontal and vertical directions.

9. The scanning system claimed in claim 8, wherein the cylindrical axis of the cylindrical lens and the image-capture optical trace form an appropriate angle.

10. The system claimed in claim 1, wherein the rotational scanning device, comprises:

a power source;

a transmission device that is coupled to the power source and is connected to the photoelectron detector, and drives and rotates the photoelectron detector in a fixed axis; and a positional sensor that detects a rotational angle of the transmission device, and measures the rotational angle and sends an angle measurement back to the operational control device.

11. A scanning system for a three-dimensional object, the scanning system comprising:

a plurality of photoelectron detectors that form and scan a light plane on the object, wherein each photoelectron detector receives and detects a reflected light stripe from the object's surface;

a plurality of rotational scanning devices that couple respectively to each photoelectron detector and rotate the photoelectron detector in a fixed axis, wherein the rotational scanning devices scan and move the light stripe on the object;

a drive device that is coupled to and drives the photoelectron detectors and the rotational scanning devices;

an image processing circuit that is coupled to the rotational scanning devices, the drive device and the image-capture circuits, wherein the image processing circuits controls the motion of the rotational scanning devices and scanning positions of the photoelectron detectors, and calculates three-dimensional coordinates of the object.

12. The scanning system claimed in claim 11, wherein each photoelectron detector, comprises:

a projecting light device that projects the light plane along a projecting optical trace on the object's surface and forms the light stripe; and an image-capture device having a fixed angle between an image-capture optical trace and a projecting optical trace, wherein the image-capture device receives and detects the reflected light stripe from the object's surface.

13. The scanning system claimed in claim 12, wherein the projecting light device comprises a narrow bandpass filter that allows a fixed wavelength of the light plane to pass through and filters the other wavelengths of surrounding environmental light.

14. The scanning system claimed in claim 13, wherein the wavelengths of the narrow bandpass filter of the photoelectron detector are different, and the light stripes formed by each photoelectron detector cannot interfere with each other.

15. The scanning system claimed in claim 12, wherein the image-capture device, comprises:

an image-sensor device that receives the light stripe and converts the light stripe to an electrical signal; and an anamorphic device that is coupled to the image-sensor device and, forms the light stripe on the image-sensor device, wherein the anamorphic device has a different horizontal magnification power and vertical magnification power, and the depth and the width of the object can be adjusted.

16. The scanning system claimed in claim 12, wherein each image-capture device further comprises a narrow bandpass filter that allows the wavelength of the respective light stripe to pass through and filters other light stripes and other wavelengths of surrounding environmental light.

17. The scanning system claimed in claim 15, wherein a sensor plane of the image sensor device and an optical trace of the anamorphic device form a fixed angle.

18. The scanning system claimed in claim 15, wherein the anamorphic device comprises:

a cylindrical lens set that is placed on the image-capture trace and receives the light stripe; and a axis-symmetrical lens that receives the light stripe from the cylindrical lens and creates the image on the image-sensor device, wherein the cylindrical lens set has a different horizontal magnification power and vertical magnification power.

19. The scanning system claimed in claim 18, wherein the cylindrical lens set comprises two cylindrical lenses at least that make the image magnifying power different between the horizontal and vertical directions.

20. The scanning system claimed in claim 19, wherein the cylindrical axis of the cylindrical lens and the image-capture optical trace form an appropriate angle.

21. The scanning system claimed in claim 11, wherein each rotational scanning device, comprises:

a power source;

a transmission device that couples to the power source and connects respectively to each photoelectron detector, wherein the transmission device drives and rotates the photoelectron detector in a fixed axis; and a positional sensor that detects a rotational angle of the transmission device, measures the rotational angle and sends an angle measurement back to the operational control device.

* * * * *